(12) United States Patent
Mols et al.

(10) Patent No.: US 10,579,431 B2
(45) Date of Patent: Mar. 3, 2020

(54) SYSTEMS AND METHODS FOR DISTRIBUTED MANAGEMENT OF COMPUTING RESOURCES

(71) Applicant: Facebook, Inc., Menlo Park, CA (US)

(72) Inventors: Alexander Sebastiaan Mols, London (GB); Phyllipe Cesar Ramos de Almeida Medeiros, London (GB); Jeffrey Scott Dunn, Seattle, WA (US); Lawrence Lomax, Coventry (GB); Rajesh Yengisetty, Seattle, WA (US); Quang Minh Tuan Nguyen, Seattle, WA (US); Zsolt Dollenstein, London (GB); Waclaw Jan Banasik, London (GB)

(73) Assignee: Facebook, Inc., Menlo Park, CA (US)

( * ) Notice: Subject to any disclaimer, the term of this patent is extended or adjusted under 35 U.S.C. 154(b) by 165 days.

(21) Appl. No.: 15/675,731

(22) Filed: Aug. 12, 2017

(65) Prior Publication Data

US 2019/0050256 A1    Feb. 14, 2019

(51) Int. Cl.
| | |
|---|---|
| *G06F 15/173* | (2006.01) |
| *G06F 9/50* | (2006.01) |
| *H04L 29/08* | (2006.01) |
| *H04L 12/26* | (2006.01) |
| *H04L 12/911* | (2013.01) |
| *H04L 12/24* | (2006.01) |

(52) U.S. Cl.
CPC .......... *G06F 9/505* (2013.01); *H04L 43/0817* (2013.01); *H04L 47/70* (2013.01); *H04L 67/1008* (2013.01); *G06F 9/5077* (2013.01); *H04L 41/5003* (2013.01); *H04L 43/0876* (2013.01)

(58) Field of Classification Search
CPC . H04L 43/0817; H04L 47/70; H04L 67/1008; H04L 41/5003; H04L 43/0876; G06F 9/505
USPC .......................................................... 709/226
See application file for complete search history.

(56) References Cited

U.S. PATENT DOCUMENTS

| | | | |
|---|---|---|---|
| 2018/0060133 A1* | 3/2018 | Fang | G06F 9/5022 |
| 2018/0109421 A1* | 4/2018 | Laribi | H04L 41/0843 |
| 2018/0203742 A1* | 7/2018 | Antony | G06F 9/5077 |

(Continued)

OTHER PUBLICATIONS

Android Debug Bridge; https://developer.android.com/studio/command-line/adb.html, as accessed Jul. 31, 2017.

*Primary Examiner* — Alan S Chou
(74) *Attorney, Agent, or Firm* — FisherBroyles, LLP

(57) ABSTRACT

A computer-implemented method for distributed management of computing resources may include (i) performing, by a computing device, an initial configuration of one or more computing resources connected to a network, (ii) detecting a request for a computing resource from a client daemon, (iii) based on the request, initializing a computing environment on the computing resource, (iv) maintaining an active state of the computing resource for a usage session by a client device, (v) detecting, from the client daemon, a notification of completion of the usage session, and (vi) in response to the notification of completion, reverting the computing resource to an initial state. Various other methods, systems, and computer-readable media are also disclosed.

20 Claims, 5 Drawing Sheets

(56) References Cited

U.S. PATENT DOCUMENTS

2018/0309822 A1* 10/2018 Baradaran ........... H04L 67/1008
2019/0036911 A1* 1/2019 Bell .................... H04L 63/1433

* cited by examiner

SYSTEMS AND METHODS FOR DISTRIBUTED MANAGEMENT OF COMPUTING RESOURCES

BACKGROUND

Through the advances in cloud computing, users may access remote computing resources over a network connection without the need to maintain physical, local resources. For example, a software developer may remotely test software on various types of hardware devices in the cloud without manually acquiring all the different types of hardware being tested. Additionally, the ability to use remote resources also provides scalability in cases where many resources are needed simultaneously. Traditionally, a client agent on a local client device may initialize a session to begin using a remote resource. The remote resource may then prepare for the session by providing the appropriate software applications or test environment.

However, given the variety of remote resources and the client devices that may need to communicate with the resources, management of both the resources and the client devices may become increasingly difficult as new resources are added to a cloud-based system. For example, client devices may require the addition of special protocols and methods to communicate with each new version of a mobile device. Furthermore, a client agent may need to wait for an initial setup of resources before being able to access and use the resources each time a new session begins. Thus, as the number and type of resources increase, client devices may interact with more complex management systems to properly utilize all of the available resources. The instant disclosure, therefore, identifies and addresses a need for better management of computing resources within a cloud-based system.

SUMMARY

As will be described in greater detail below, the instant disclosure describes various systems and methods for distributed management of computing resources by implementing a decentralized management system that coordinates client usage of the computing resources. In one example, a computer-implemented method for distributed management of computing resources may include (i) performing, by a computing device, an initial configuration of one or more computing resources connected to a network, (ii) detecting a request for a computing resource from a client daemon, (iii) based on the request, initializing a computing environment on the computing resource, (iv) maintaining an active state of the computing resource for a usage session by a client device, (v) detecting, from the client daemon, a notification of completion of the usage session, and (vi) in response to the notification of completion, reverting the computing resource to an initial state.

In one embodiment, performing the initial configuration of the computing resource may include configuring one or more initial settings on the computing resource. Additionally, performing the initial configuration may include performing a health check for the computing resource.

In some examples, the request may include a request for a type of the computing resource. Additionally or alternatively, the request may include a request for an amount of the computing resource. In further examples, the request for the computing resource may be detected via a resource scheduler. In these examples, the resource scheduler may include a matching service that automatically matches the request with the computing device managing the computing resource.

In some embodiments, the client daemon may include a management tool, running on the client device, that creates the request for the computing resource by determining a need for the computing resource, reserving an instance with the computing device, and implementing a protocol to communicate with the computing resource. Additionally, the client daemon may inform a user about an availability of the computing resource and initiate the usage session.

In one example, initializing the computing environment may include installing an application on the computing resource. Additionally or alternatively, initializing the computing environment may include adjusting a setting on the computing resource.

In one embodiment, maintaining the active state of the computing resource may include maintaining a setting on the computing resource. Additionally or alternatively, maintaining the active state of the computing resource may include performing a status check on the computing resource and/or performing an additional status check on the client daemon.

In some examples, detecting the notification of completion of the usage session may include detecting an idle status of the computing resource. Additionally or alternatively, detecting the notification may include receiving, via the client daemon, an instruction from a user to end the usage session.

In some embodiments, reverting the computing resource to the initial state may include uninstalling an application on the computing resource and/or reverting a setting on the computing resource. Additionally, reverting the computing resource may include uploading metadata about the usage session to a central database.

In one example, the computer-implemented method may further include receiving a connection request for the client device. In this example, the computer-implemented method may also include connecting the client device to the network as an additional computing resource.

In addition, a corresponding system for distributed management of computing resources may include several modules stored in memory, including (i) a performance module that performs, by a computing device, an initial configuration of one or more computing resources connected to a network, (ii) a detection module that detects a request for a computing resource from a client daemon, (iii) an initialization module that initializes a computing environment on the computing resource based on the request, (iv) a maintenance module that maintains an active state of the computing resource for a usage session by a client device, (v) a completion module that detects, from the client daemon, a notification of completion of the usage session, and (vi) a reversion module that reverts the computing resource to an initial state in response to the notification of completion. The system may also include one or more processors that execute the performance module, the detection module, the initialization module, the maintenance module, the completion module, and the reversion module.

In some examples, the above-described method may be encoded as computer-readable instructions on a computer-readable medium. For example, a computer-readable medium may include one or more computer-executable instructions that, when executed by one or more processors of a computing device, may cause the computing device to (i) perform an initial configuration of one or more computing resources connected to a network, (ii) detect a request for a computing resource from a client daemon, (iii) based on the request, initialize a computing environment on the computing resource, (iv) maintain an active state of the computing resource for a usage session by a client device, (v) detect, from the client daemon, a notification of completion of the usage session, and (vi) in response to the notification of completion, revert the computing resource to an initial state.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
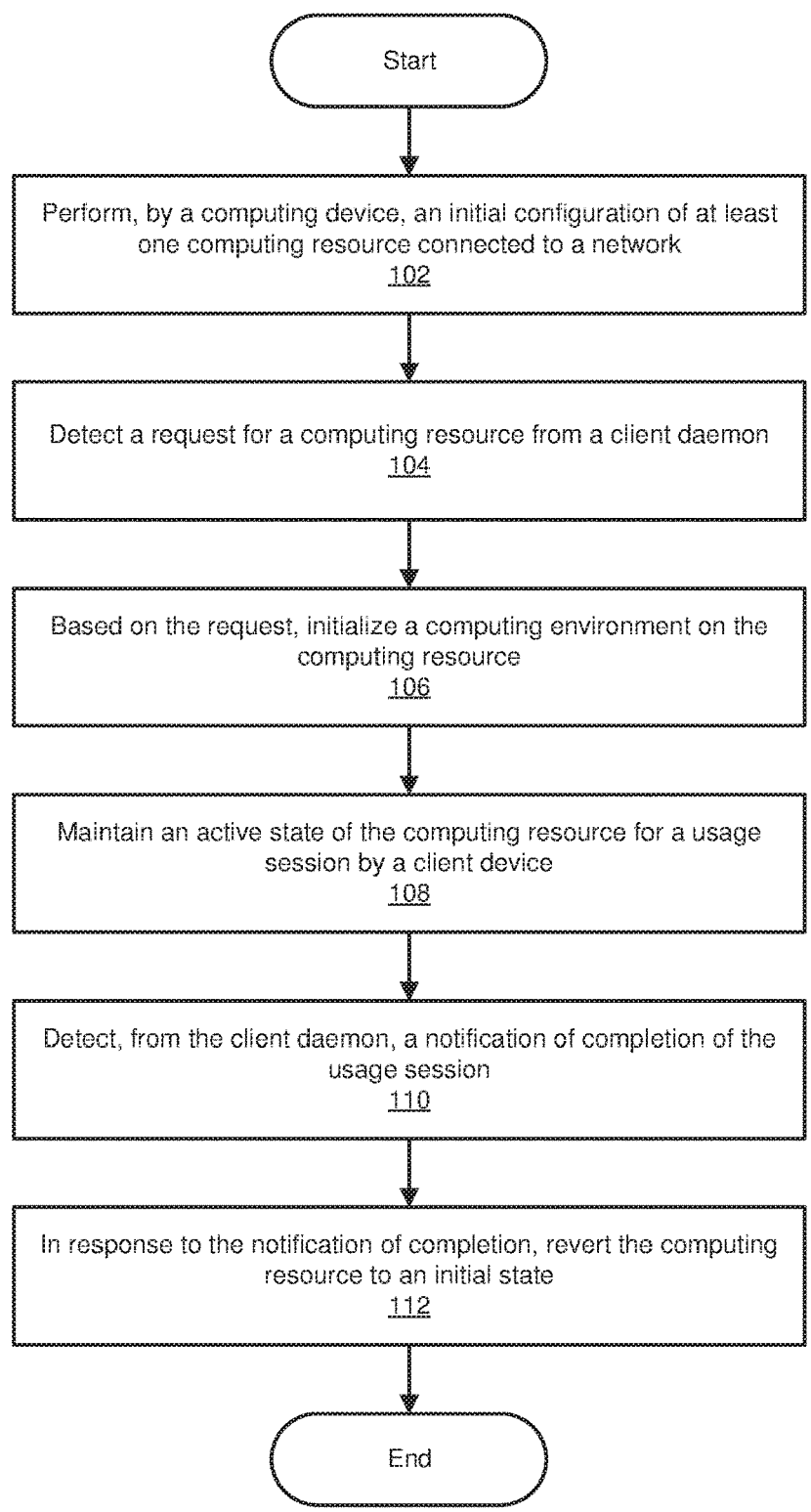
FIG. 1 is a flow diagram of an exemplary method for distributed management of computing resources.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for distributed management of computing resources. As will be explained in greater detail below, embodiments of the instant disclosure may, by preparing computing resources prior to client requests for the resources, reduce client-side latency during resource setup. For example, by reverting to an initial state after each client session on a computing resource, the disclosed systems and methods may reduce a wait-time for the next client to use the computing resource. The systems and methods described herein may also perform health checks and updates to ensure computing resources are ready and available for client use. Additionally, by coordinating client sessions for specific resources or groups of resources, the disclosed systems and methods may decentralize the management of resources to provide more local support.

In addition, the systems and methods described herein may improve the functioning of a computing device by providing a connection between client daemons and resource managers to reduce the complexity and latency of client-side systems. These systems and methods may also improve the fields of cloud computing and/or resource management by improving interactivity between client devices and computing resources and enabling client devices to act as resources.

The following will provide, with reference to FIG. 1, detailed descriptions of computer-implemented methods for distributed management of computing resources. Detailed descriptions of corresponding example systems will also be provided in connection with FIGS. 2 and 3. In addition, detailed descriptions of an exemplary client device connected to an exemplary computing resource will be provided in connection with FIG. 4. Furthermore, detailed descriptions of an exemplary usage of a client device as a computing resource will be provided in connection with FIG. 5.

FIG. 1 is a flow diagram of an exemplary computer-implemented method 100 for distributed management of computing resources. The steps shown in FIG. 1 may be performed by any suitable computer-executable code and/or computing system, such as the systems described herein. In one example, each of the steps shown in FIG. 3 may represent an algorithm whose structure includes and/or is represented by multiple sub-steps, examples of which will be provided in greater detail below.

Figure 2:
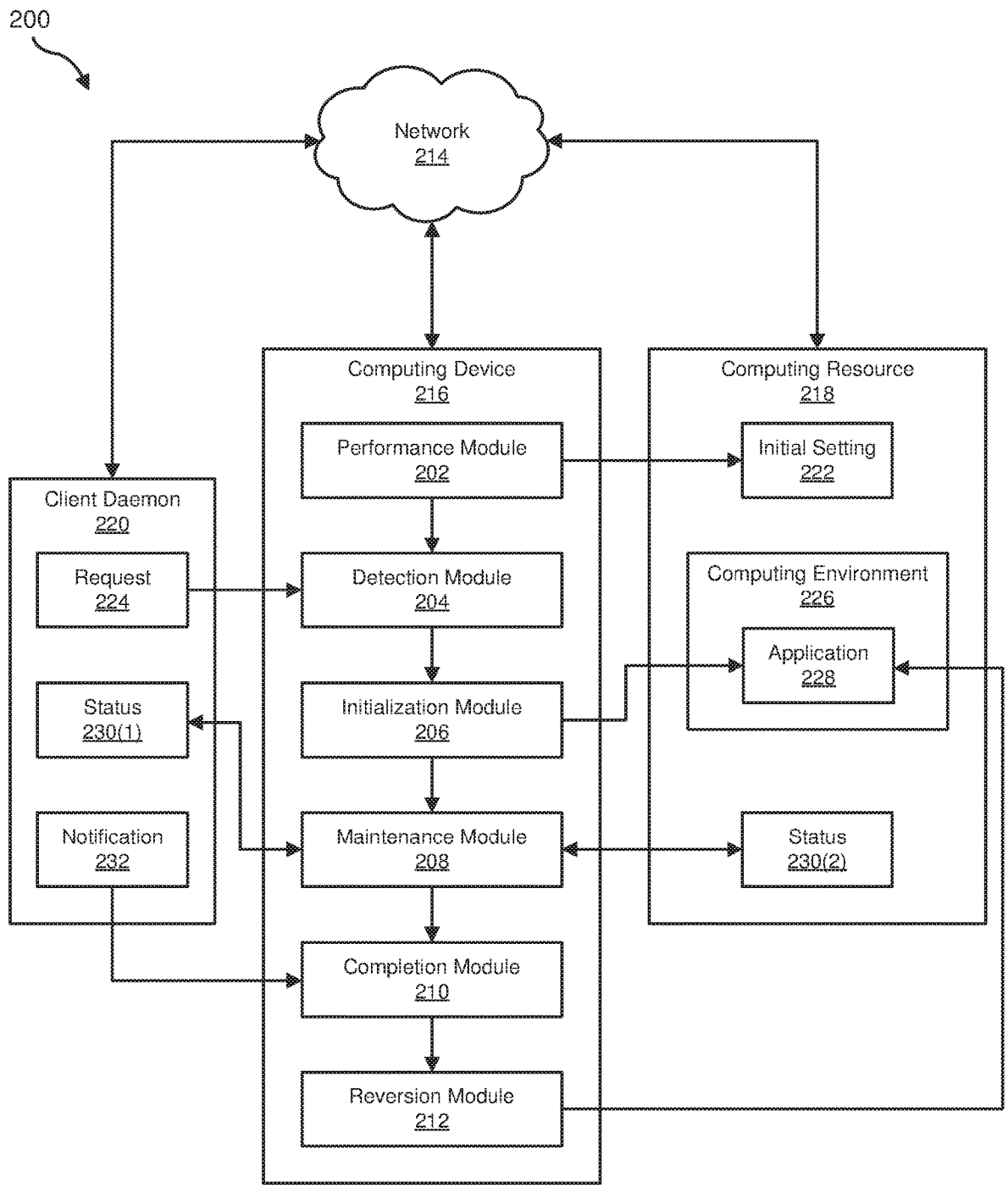
FIG. 2 is a block diagram of an exemplary system for distributed management of computing resources.

As illustrated in FIG. 1, at step 102, one or more of the systems described herein may perform, by a computing device, an initial configuration of one or more computing resources connected to a network. For example, FIG. 2 is a block diagram of exemplary system 200 for distributed management of computing resources. As illustrated in FIG. 2, a computing device 216 may include a performance module 202 that performs an initial configuration of a computing resource 218 connected to a network 214.

Computing device 216 generally represents any type or form of computing device capable of reading computer-executable instructions. For example, computing device 216 may represent a runtime administrative device that monitors and manages a set of computing resources, such as computing resource 218. Additional examples of computing device 216 may include, without limitation, laptops, tablets, desktops, application servers, database servers, and/or mainframes configured to run certain software applications and/or provide various security, web, storage, and/or management services. Although illustrated as a single entity in FIG. 2, computing device 216 may include and/or represent a plurality of computing devices that work and/or operate in conjunction with one another. Furthermore, although illustrated as connected via network 214, computing device 216 may represent a local management device directly connected to computing resource 218.

Computing resource 218 generally represents any type or form of computing hardware or software capable of reading computer-executable instructions. For example, computing resource 218 may represent a mobile device with a software-testing environment or a mobile operating system with an application-testing environment. Computing resource 218 may also represent part of a cloud-based environment that provides resources to clients. As used herein, the terms "cloud-based environment" or "cloud service" generally refer to a resource or service that is provided over a network, such as the Internet. Additional examples of computing resources include, without limitation, laptops, tablets, desktops, servers, cellular phones, Personal Digital Assistants (PDAs), multimedia players, embedded systems, wearable devices (e.g., smart watches, smart glasses, etc.), gaming consoles, databases, operating systems, software environments, virtual machines, routers and/or network devices, combinations of one or more of the same, and/or any other suitable computing resource.

Network 214 generally represents any medium or architecture capable of facilitating communication or data transfer. In one example, network 214 may facilitate communication between computing device 216 and computing resource 218. Network 214 may also facilitate communication between computing device 216 and client daemon 220 and/or client devices (e.g., client device 304 of FIG. 4). Network 214 may also represent a cloud-based network that facilitates communication between multiple computing resources and computing devices to manage the resources. In these examples, network 214 may facilitate communication or data transfer using wireless and/or wired connections. Examples of network 214 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Performance module 202 may perform the initial configuration of computing resource 218 in a variety of ways. In one example, performance module 202 may configure an initial setting 222 on computing resource 218. In this example, initial setting 222 may include unlocking computing resource 218, initializing software to enable remote control by a client, and/or any other action to prepare computing resource 218. In alternate examples, performance module 202 may perform a health check for computing resource 218 to determine whether computing resource 218 is viable. For example, computing device 216 may determine that computing resource 218 has low power and requires charging before use by a client. Alternatively, computing device 216 may determine that computing resource 218 is not healthy enough for use and may require replacement with a new device and/or remove computing resource 218 from network 214. In this example, computing device 216 may alert an administrator about the health of computing resource 218.

Returning to FIG. 1, at step 104, one or more of the systems described herein may detect a request for a computing resource from a client daemon. In the example of FIG. 2, a detection module 204 may detect a request 224 for computing resource 218 from a client daemon 220. As used herein, the term "daemon" generally refers to a software application that automates certain computing functions for a user. Notably, a client daemon may automatically connect to and interact with computing device 216 and/or computing resource 218 when a client requests a resource.

Detection module 204 may detect request 224 in a variety of ways. In some embodiments, request 224 may include a request for a type of computing resource 218, such as a type of hardware and/or a version of an operating system. Additionally or alternatively, request 224 may include a request for an amount of computing resource 218, such as a number of devices and/or an amount of time to use computing resource 218. In these embodiments, request 224 for computing resource 218 may be detected via a resource scheduler, and detection module 204 may represent the resource scheduler. Alternatively, computing device 216 may receive request 224 from the resource scheduler.

Figure 3:
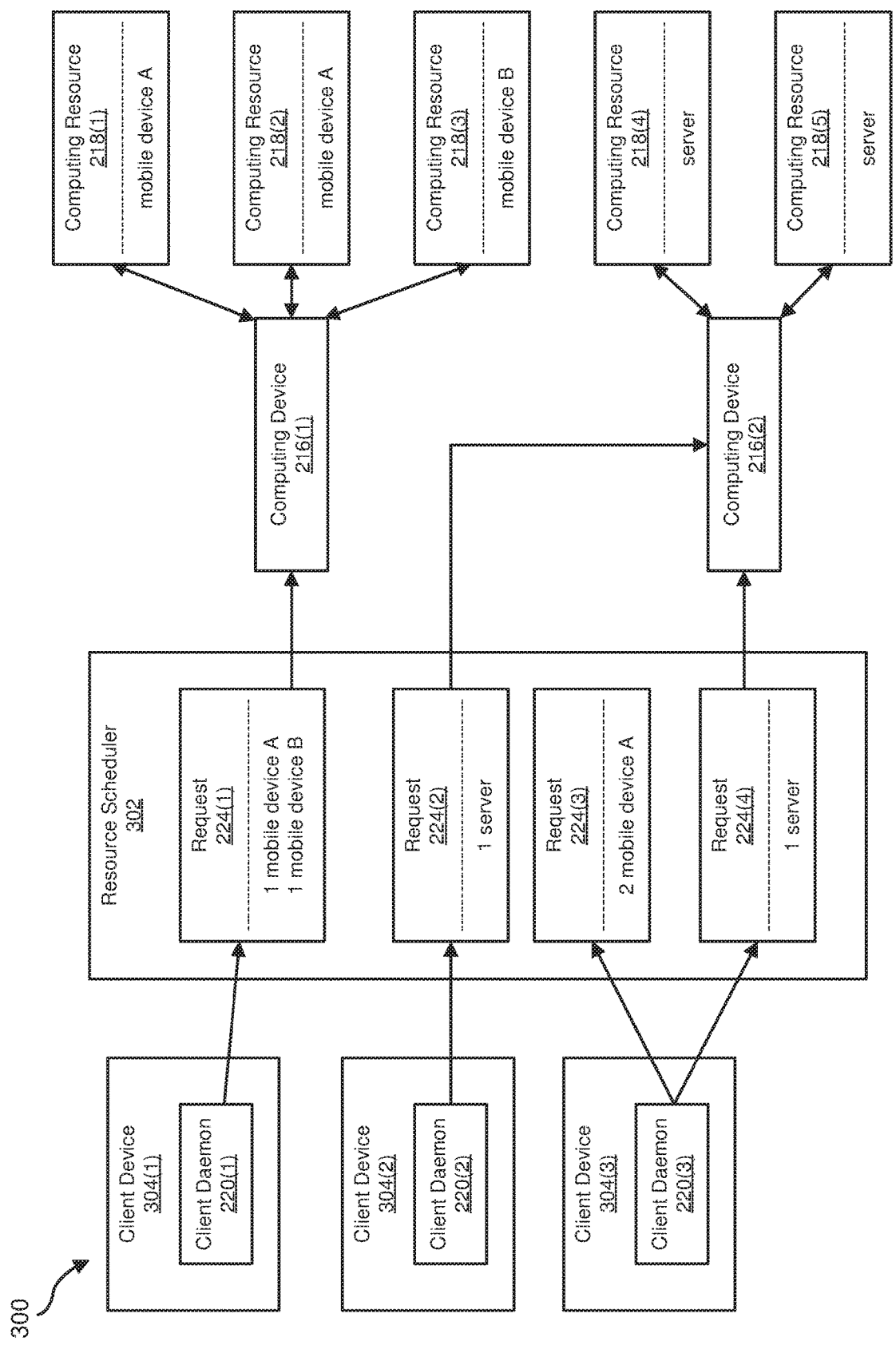
FIG. 3 is a block diagram of an additional exemplary system for distributed management of computing resources.

FIG. 3 is a block diagram of an additional exemplary system 300 for distributed management of computing resources. As shown in FIG. 3, a computing device 216(1) may detect a request 224(1) from a client device 304(1) via a resource scheduler 302. In this example, computing device 216(1) may manage a computing resource 218(1), a computing resource 218(2), and a computing resource 218(3). A computing device 216(2) may also detect a request 224(2) from a client device 304(2) and a request 224(4) from a client device 304(3) via resource scheduler 302. Computing device 216(2) may manage a computing resource 218(4) and a computing resource 218(5). In the example of FIG. 3, computing device 216(1) may manage mobile devices, and computing device 216(2) may manage servers. In other examples, different computing devices may manage different models or versions of similar computing resources.

Figure 4:
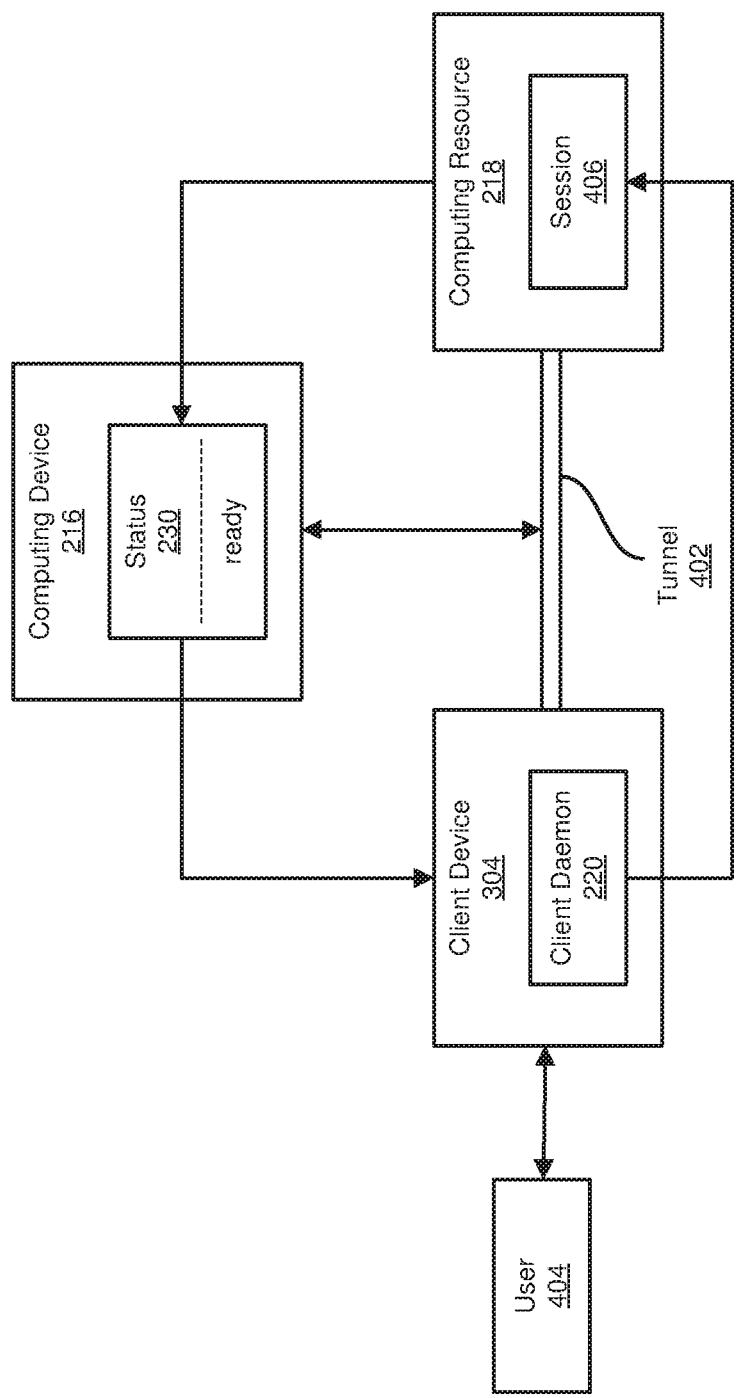
FIG. 4 is a block diagram of an exemplary client device connected to an exemplary computing resource.

Client devices 304(1)-(3) and/or client device 304 of FIG. 4 generally represent any type or form of computing device capable of reading computer-executable instructions. For example, client device 304 may represent an endpoint device running client-side developer software. Notably, client devices may represent devices similar to computing device 216 and/or resources similar to computing resource 218.

In the example of FIG. 2, client daemon 220 may include a management tool, running on a client device, that creates request 224 for computing resource 218 by determining a need for computing resource 218, reserving an instance with computing device 216, implementing a protocol to communicate with computing resource 218, informing a user about an availability of computing resource 218, and initiating a usage session. The term "instance," as used herein, generally refers to a specific runtime object that provides a concrete value. Notably, an instance may include a reserved usage session for a computing resource. The term "protocol," as used herein, generally refers to a standard of communication or method to exchange data over a network. Different protocols may facilitate communication between client devices 304(1)-(3) and computing resources 218(1)-(5), depending on the types of computing resources.

FIG. 4 is a block diagram of an exemplary client device 304 connected to computing resource 218. As illustrated in FIG. 4, client daemon 220 may run on client device 304. A user 404 may interact with client device 304, and client daemon 220 may determine user 404 requires computing resource 218 based on a direct request from user 404 and/or a calculation of required resources to perform functions for the usage session. In this example, client daemon 220 may implement the protocol by creating a tunnel 402 to communicate with computing resource 218. The term "tunnel," as used herein, generally refers to a method of communicating directly with a computing device or service by bypassing supported protocols. For example, client daemon 220 and computing resource 218 may initially send messages via mailboxes on client device 304 and computing resource 218 to establish a Secure Shell (SSH) protocol for tunnel 402. Furthermore, computing device 216 may check a status 230 of computing resource 218, to determine computing resource 218 is ready and may transmit status 230 to client device 304. Client daemon 220 may then facilitate informing user 404 about status 230, such as by providing technical details about computing resource 218. In alternate examples, client daemon 220 may determine, via computing device 216, that computing resource 218 is not ready and provide status 230 to user 404 until computing resource 218 is ready. Furthermore, client daemon 220 may then initiate a session 406 on computing resource 218 for user 404.

In some examples, user 404 may interact with computing resource 218 via a software application, such as a web browser on client device 304. For example, tunnel 402 may facilitate streaming of the computing environment of computing resource 218 to client daemon 220. In this example, tunnel 402 may stream the interface of computing resource 218 to client daemon 220, which may then facilitate display of the interface within the web browser on client device 304. In additional examples, client daemon 220 may facilitate simultaneous communication with multiple computing resources for session 406. For example, as shown in FIG. 3, client device 304(1) may request computing resource 218(1) (e.g., "mobile device A") and computing resource 218(3) (e.g., "mobile device B") for a single usage session. In this example, a client daemon 220(1) may establish protocols for both computing resource 218(1) and computing resource 218(3). Additionally or alternatively, multiple clients may share a single usage session. For example, client device 304(1) and client device 304(3) may both share a session using computing resource 218(1) to coordinate a test environment. Similarly, a user of client device 304(1) may stream a usage session of computing resource 218(1) to client device 304(3) to enable a second user to view and/or participate.

In one embodiment, resource scheduler 302 of FIG. 3 may include a matching service that automatically matches requests with computing devices managing computing resources. As illustrated in FIG. 3, resource scheduler 302 may match request 224(1), from client daemon 220(1), with computing device 216(1) for computing resource 218(1) and computing resource 218(3). Resource scheduler 302 may also match request 224(2), from a client daemon 220(2), and request 224(4), from a client daemon 220(3), with computing device 216(2) for computing resource 218(4) and computing resource 218(5). In this example, resource scheduler 302 may determine that there are not enough resources to fulfill a request 224(3) from client daemon 220(3) and may hold request 224(3) until other requests, such as request 224(1), are complete. Furthermore, client devices 304(1)-(3) may send requests 224(1)-(4) to resource scheduler 302 via a network, such as network 214, and resource scheduler 302 may then send requests 224(1)-(4) to computing device 216(1) and/or computing device 216(2) via the network. In some embodiments, after being matched with a computing device, client daemons may disconnect from resource scheduler 302 and connect directly to the computing device.

Returning to FIG. 1, at step 106, one or more of the systems described herein may, based on the request, initialize a computing environment on the computing resource. For example, an initialization module 206 may, as part of computing device 216 in FIG. 2, initialize a computing environment 226 on computing resource 218. As used herein, the term "computing environment" generally refers to a system of hardware and/or software that encompasses the capabilities of a computer.

Initialization module 206 may initialize computing environment 226 in a variety of ways. In some examples, initialization module 206 may install an application 228 on computing resource 218. The term "application," as used herein, generally refers to a software program designed to perform specific functions or tasks and capable of being installed, deployed, executed, and/or otherwise implemented on a computing system. Examples of applications may include, without limitation, productivity software, enterprise software, entertainment software, security applications, cloud-based applications, web applications, mobile applications, content access software, simulation software, integrated software, application packages, application suites, variations or combinations of one or more of the same, and/or any other suitable software application.

In the above examples, initialization module 206 may install application 228 via network 214. In other examples, computing device 216 may be locally connected to computing resource 218, and initialization module 206 may directly install application 228, which may function as a satellite service for a resource management system, on computing resource 218. Additionally or alternatively, initialization module 206 may adjust a setting on computing resource 218, such as by changing initial setting 222 based on request 224. Initialization module 206 may also adjust settings, such as by initializing connections to additional hardware or launching software applications on computing resource 218.

Returning to FIG. 1, at step 108, one or more of the systems described herein may maintain an active state of the computing resource for a usage session by a client device. For example, a maintenance module 208 may, as part of computing device 216 in FIG. 2, maintain a state of computing resource 218 for client daemon 220.

Maintenance module 208 may maintain the state of computing resource 218 in a variety of ways. In one embodiment, maintenance module 208 may perform a status check on client daemon 220 to determine a status 230(1). Maintenance module 208 may also perform a status check on computing resource 218 to determine a status 230(2). Additionally or alternatively, maintenance module 208 may maintain a setting on computing resource 218, such as initial setting 222.

As illustrated in FIG. 4, computing device 216 may maintain the state of computing resource 218 by monitoring status 230. In this example, computing device 216 may continue to monitor status 230 to ensure tunnel 402 between client device 304 and computing resource 218 remains active for the duration of session 406. Computing device 216 may also monitor response time from computing resource 218 and/or client device 304 to determine whether computing resource 218 and/or client device 304 is idle for a long period of time.

Although illustrated as a tunnel between client device 304 and computing resource 218 in FIG. 4, in some embodiments, tunnel 402 may represent a tunnel through computing device 216 acting as a proxy to establish the connection between client device 304 and computing resource 218. For example, computing device 216 may utilize a Transmission Control Protocol/Internet Protocol (TCP/IP) tunnel to connect to computing resource 218 and may establish an SSH tunnel to connect to computing device 304. In these embodiments, computing device 216 may then act as a proxy to interpret commands from client daemon 220 to computing resource 218 such that computing resource 218 acts as a local resource for client device 304. For example, computing resource 218 may represent a mobile device with an ANDROID operating system, and user 404 may be an application developer testing a mobile application. In this example, computing device 216 may support communication tools, such as ANDROID DEBUG BRIDGE, to facilitate transferring commands from client device 304 to computing resource 218. Computing device 216 may also support additional communication tools and protocols to facilitate transferring commands from client device 304 to additional resources. In the above example, user 404 may additionally need a mobile device with an IOS operating system to test the mobile application on a different platform. By acting as a proxy, computing device 216 may facilitate the use of client device 304 to test the mobile application on alternate resources with different structures and protocols by interpreting and transmitting commands. Thus, computing device 216 may actively maintain the connection between client daemon 220 and computing resource 218.

Returning to FIG. 1, at step 110, one or more of the systems described herein may detect, from the client daemon, a notification of completion of the usage session. For example, a completion module 210 may, as part of computing device 216 in FIG. 2, detect a notification 232 from client daemon 220.

Completion module 210 may detect notification 232 in a variety of ways. In some examples, completion module 210 may receive an instruction from a client, such as user 404 of client device 304 in FIG. 4, to end session 406. In these examples, user 404 may directly input a command to release computing resource 218, and client daemon 220 may forward the command to computing device 216. Alternatively, client daemon 220 may request a continuation of session 406 if client daemon 220 detects additional requests for client device 304 that require computing resource 218.

In additional examples, completion module 210 may detect an idle status of computing resource 218. In the example of FIG. 4, computing device 216 may detect status 230 has changed, which may indicate the connection between client device 304 and computing resource 218 has dropped. For example, tunnel 402 may disconnect due to a network issue or a failure of computing resource 218. Computing device 216 may detect the disconnect and send a new status to client daemon 220. Alternatively, computing device 216 may attempt to redirect client daemon 220 to a similar computing resource to complete session 406. For example, computing device 216(1) of FIG. 3 may redirect client daemon 220(1) to computing resource 218(2) if computing resource 218(1) experiences a failure. Thus, computing device 216(1) may continue to fulfill request 224(1) with a similar resource.

Returning to FIG. 1, at step 112, one or more of the systems described herein may, in response to the notification of completion, revert the computing resource to an initial state. For example, a reversion module 212 may, as part of computing device 216 in FIG. 2, revert computing resource 218 to an initial state.

Reversion module 212 may revert computing resource 218 in a variety of ways. In some embodiments, reversion module 212 may uninstall application 228 on computing resource 218. In additional embodiments, reversion module 212 may revert a setting on computing resource 218, such as by reverting changes to initial setting 222. In these embodiments, reversion module 212 may also perform a reboot of computing resource 218, revert to a previously captured image of computing resource 218, delete data from computing resource 218, and/or perform any other action to prepare computing resource 218 for a new usage session. In the example of FIG. 3, client daemon 220(3) may request two usage sessions on resources similar to computing resource 218(1). Rather than processing the usage sessions in series on computing resource 218(1) and waiting to revert after each session, computing device 216(1) may connect client daemon 220(3) to computing resource 218(1) and computing resource 218(2) to process the usage sessions in parallel and then revert computing resource 218(1) and computing resource 218(2) to their initial states.

Additionally or alternatively, reversion module 212 may upload metadata about session 406 of FIG. 4 to a central database. As used herein, the term "metadata" generally refers to data that describes a file and/or a process. For example, metadata about session 406 may include applications used by user 404, a length of time of session 406, a log of session 406, a video of session 406, and/or any other information about session 406 that may provide details about usage. User 404 and/or an administrator may access the metadata to review session 406. In other examples, computing device 216 may utilize the metadata to perform a health check on computing resource 218. For example, the metadata may include response times of computing resource 218 to commands from client device 304, and slowing response times may indicate failing components on computing resource 218.

In one embodiment, the systems described herein may further include receiving a connection request for a client device and, subsequently, connecting the client device to network 214 as an additional computing resource. In this embodiment, an administrator may connect the client device as a computing resource or the client device may automatically present as a computing resource. For example, the client device may use a tunneling protocol similar to protocols used for computing resources to connect to network 214 and broadcast as a computing resource available to other client devices connected to the cloud service.

Figure 5:
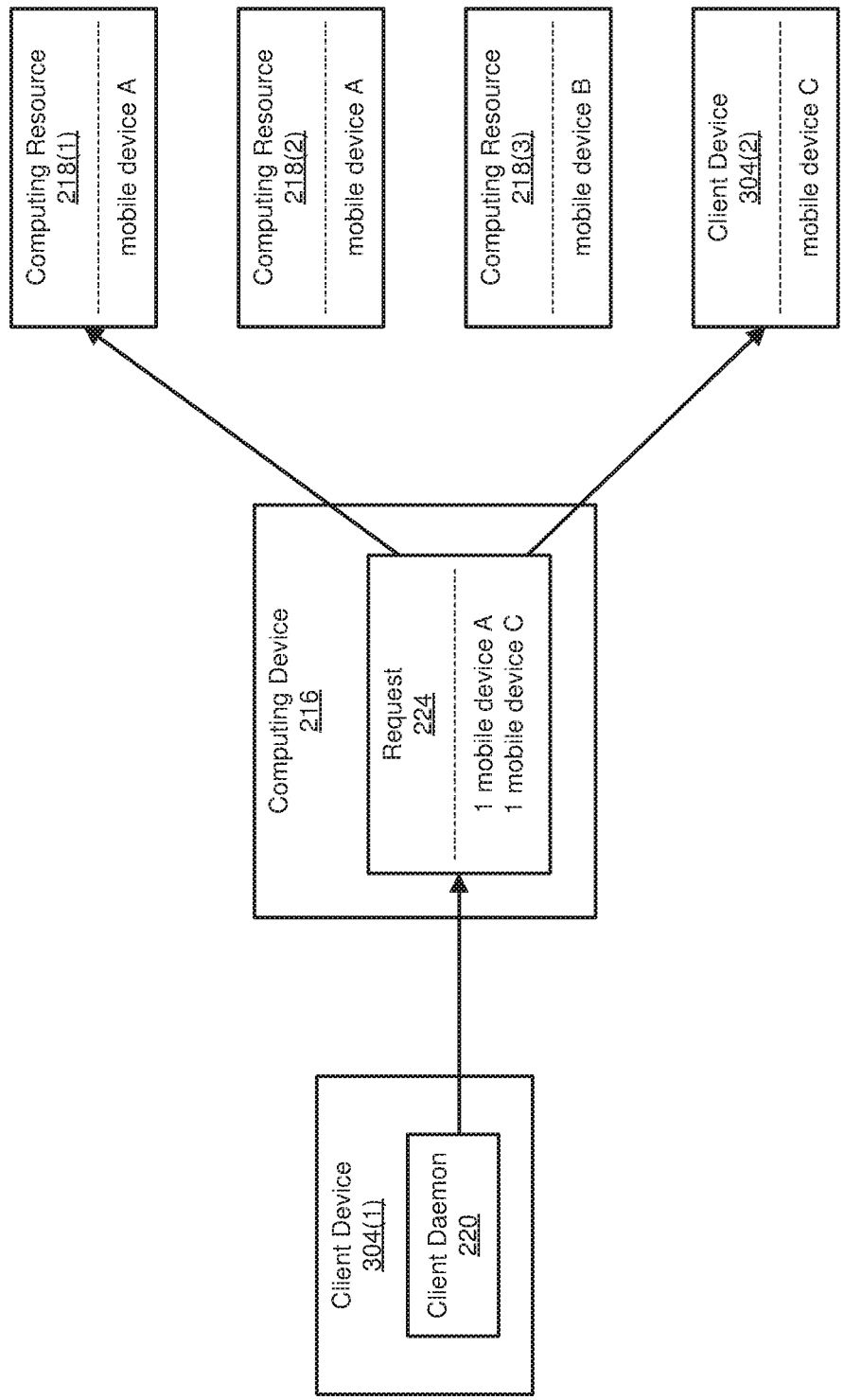
FIG. 5 is a block diagram of an exemplary usage of a client device as a computing resource.

FIG. 5 is a block diagram of an exemplary usage of client device 304(2) as a computing resource. In the example of FIG. 5, client device 304(2) may be an obscure mobile device model (e.g., "mobile device C"), and a user of client device 304(1) may want to run tests on client device 304(2). The user of client device 304(1) may also have access to client device 304(2) and may send a request from client device 304(2) to connect to computing device 216 as a computing resource. Client daemon 220 on client device 304(1) may then send request 224 to computing device 216 for computing resource 218(1) (e.g., "mobile device A") and client device 304(2) (e.g., "mobile device C").

As explained above in connection with method 100 in FIG. 1, the disclosed systems and methods may, by implementing computing resource management systems on computing devices, decentralize the management of various types of computing resources in a cloud-based environment. Specifically, the disclosed systems and methods may first configure resources in a cloud network, such as by conducting health checks of the resources. By performing preparation steps for computing resources prior to request by clients, the systems and methods described herein may reduce wait times for the clients when the resources are finally needed. By installing required applications and initializing the environment locally, the systems and methods described herein may also reduce traditional setup time, such as the time taken to download required applications over the network. In addition, by managing multiple resources locally, the disclosed systems and methods may enable parallel processing of client requests, rather than waiting to prepare a resource after each request is completed in series. Then, by reverting a resource to an initial state after a user completes a session, the disclosed systems and methods may prepare, during an idle period, for subsequent use of the resource.

Additionally, the systems and methods described herein may provide a bridge of communication between client devices and computing resources, potentially using tunneling or various network protocols, to emulate a local resource experience for clients that is more interactive than traditional batch request fulfillment. In some examples, the systems and methods described herein may also maintain an active session between a resource and a client device by interpreting commands from the resource to the client device. Furthermore, by accepting client devices as potential cloud resources, the disclosed systems and methods may provide clients with access to a larger variety and greater quantity of computing resources. The disclosed systems and methods may also easily update or manage resources without requiring changes to client devices. Thus, the systems and methods described herein may improve the management of cloud-based computing resources by shifting some management responsibilities to a separate computing device, rather than a client device or a resource, and providing users with the capabilities of local resources.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a request for a computing resource, transform the request, output a result of the transformation to a storage or output device, use the result of the transformation to initialize an environment of the computing resource, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   performing, by a computing device, an initial configuration of at least one computing resource connected to a network;
   detecting a request for the computing resource from a client daemon;
   based on the request, initializing a computing environment on the computing resource;
   maintaining an active state of the computing resource for a usage session by a client device;
   establishing the computing device as a proxy between the client device and the computing resource, such that the computing device, acting as a proxy, allows communication between the client daemon and at least two different types of computing resources configured to receive commands for configuration and testing on the computing resources;
   detecting, from the client daemon, a notification of completion of the usage session; and
   in response to the notification of completion, reverting the computing resource to an initial state.

2. The method of claim 1, wherein performing the initial configuration of the computing resource comprises:
 configuring at least one initial setting on the computing resource; and
 performing a health check for the computing resource.

3. The method of claim 1, wherein the request comprises at least one of:
 a request for a type of the computing resource; or
 a request for an amount of the computing resource.

4. The method of claim 1, wherein the client daemon comprises a management tool, running on the client device, that creates the request for the computing resource by:
 determining a need for the computing resource;
 reserving an instance with the computing device;
 implementing a protocol to communicate with the computing resource;
 informing a user about an availability of the computing resource; and
 initiating the usage session.

5. The method of claim 1, wherein:
 the request for the computing resource is detected via a resource scheduler; and
 the resource scheduler comprises a matching service that automatically matches the request with the computing device managing the computing resource.

6. The method of claim 1, wherein initializing the computing environment comprises at least one of:
 installing an application on the computing resource; or
 adjusting a setting on the computing resource.

7. The method of claim 1, wherein maintaining the active state of the computing resource comprises at least one of:
 maintaining a setting on the computing resource;
 performing a status check on the computing resource; or
 performing an additional status check on the client daemon.

8. The method of claim 1, wherein detecting the notification of completion of the usage session comprises at least one of:
 detecting an idle status of the computing resource; or
 receiving, via the client daemon, an instruction from a user to end the usage session.

9. The method of claim 1, wherein reverting the computing resource to the initial state comprises at least one of:
 uninstalling an application on the computing resource;
 reverting a setting on the computing resource; or
 uploading metadata about the usage session to a central database.

10. The method of claim 1, further comprising:
 receiving a connection request for the client device; and
 connecting the client device to the network as an additional computing resource.

11. A system comprising:
 a performance module, stored in memory, that performs, by a computing device, an initial configuration of at least one computing resource connected to a network;
 a detection module, stored in memory, that detects a request for the computing resource from a client daemon;
 an initialization module, stored in memory, that initializes a computing environment on the computing resource based on the request;
 a maintenance module, stored in memory, that maintains an active state of the computing resource for a usage session by a client device;
 a completion module, stored in memory, that detects, from the client daemon, a notification of completion of the usage session;
 a reversion module, stored in memory, that reverts the computing resource to an initial state in response to the notification of completion; and
 at least one processor that executes the performance module, the detection module, the initialization module, the maintenance module, the completion module, and the reversion module;
 establishing the computing device as a proxy between the client device and the computing resource, the establishing including:
  receiving, from the client daemon, one or more commands that are to be carried out on the computing resource, at least one of the commands being configured to initiate testing on the computing resource;
  interpreting the commands received from the client daemon; and
  transferring the interpreted commands to the computing resource, the proxy allowing communication between the client daemon and at least two different types of computing resources.

12. The system of claim 11, wherein the performance module performs the initial configuration of the computing resource by:
 configuring at least one initial setting on the computing resource; and
 performing a health check for the computing resource.

13. The system of claim 11, wherein the request comprises at least one of:
 a request for a type of the computing resource; or
 a request for an amount of the computing resource.

14. The system of claim 11, wherein the client daemon comprises a management tool, running on the client device, that creates the request for the computing resource by:
 determining a need for the computing resource;
 reserving an instance with the computing device;
 implementing a protocol to communicate with the computing resource;
 informing a user about an availability of the computing resource; and
 initiating the usage session.

15. The system of claim 11, wherein:
 the detection module comprises a resource scheduler; and
 the resource scheduler comprises a matching service that automatically matches the request with the computing device managing the computing resource.

16. The system of claim 11, wherein the initialization module initializes the computing environment by at least one of:
 installing an application on the computing resource; or
 adjusting a setting on the computing resource.

17. The system of claim 11, wherein the maintenance module maintains the active state of the computing resource by at least one of:
 maintaining a setting on the computing resource;
 performing a status check on the computing resource; or
 performing an additional status check on the client daemon.

18. The system of claim 11, wherein the completion module detects the notification of completion of the usage session by at least one of:
 detecting an idle status of the computing resource; or
 receiving, via the client daemon, an instruction from a user to end the usage session.

19. The system of claim 11, wherein the reversion module reverts the computing resource to the initial state by at least one of:
 uninstalling an application on the computing resource;

reverting a setting on the computing resource; or uploading metadata about the usage session to a central database.

20. A computer-readable medium comprising one or more computer-executable instructions that, when executed by at least one processor of a computing device, cause the computing device to:

perform, by the computing device, an initial configuration of at least one computing resource connected to a network;

detect a request for the computing resource from a client daemon;

based on the request, initialize a computing environment on the computing resource;

maintain an active state of the computing resource for a usage session by a client device;

establish the computing device as a proxy between the client device and the computing resource, such that the computing device, acting as a proxy, allows communication between the client daemon and at least two different types of computing resources configured to receive commands for configuration and testing on the computing resources;

detect, from the client daemon, a notification of completion of the usage session; and in response to the notification of completion, revert the computing resource to an initial state.

* * * * *